July 23, 1968     S. BUCK     3,393,892

NON-TIPPING DRINKING GLASS COASTER

Filed Oct. 14, 1966

INVENTOR.
SADIE BUCK

United States Patent Office 3,393,892
Patented July 23, 1968

3,393,892
NON-TIPPING DRINKING GLASS COASTER
Sadie Buck, 414 E. Bridgeport, % Ed Buck,
Spokane, Wash. 99207
Filed Oct. 14, 1966, Ser. No. 586,836
3 Claims. (Cl. 248—346.1)

ABSTRACT OF THE DISCLOSURE

A coaster for detachably receiving a drinking glass and for holding same in such manner that the glass cannot be tipped over accidentally.

Summary of the invention

My non-tipping coaster comprises a flat horizontal solid weighted disc with a lip peripherally secured thereto and extending upward and inward therefrom. A horizontal circular ring centered in the disc is supported rigidly by three spaced apart upwardly and inwardly extending bars which hold the ring in position above disc and lip. First and second horizontal parallel spaced apart bars span the lip, the top surface of the bars being flush with the top surface of the lip.

The diameter of the ring is large enough to accommodate the glass and yet is smaller than that of the disc. The horizontal bars support the bottom of the glass.

Detailed description of preferred embodiment

Figure 1:
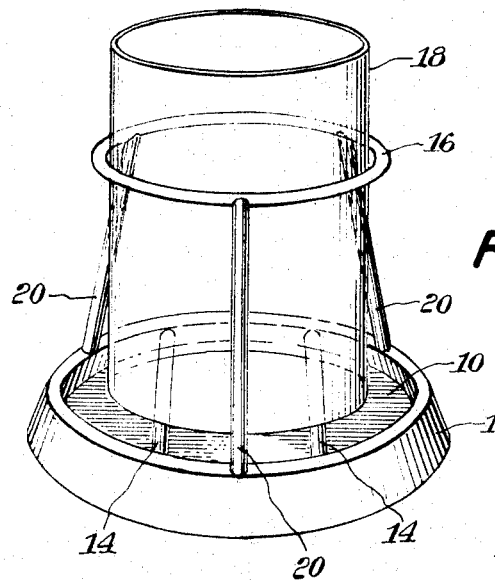
FIG. 1 is a perspective view of my invention.
Figure 2:
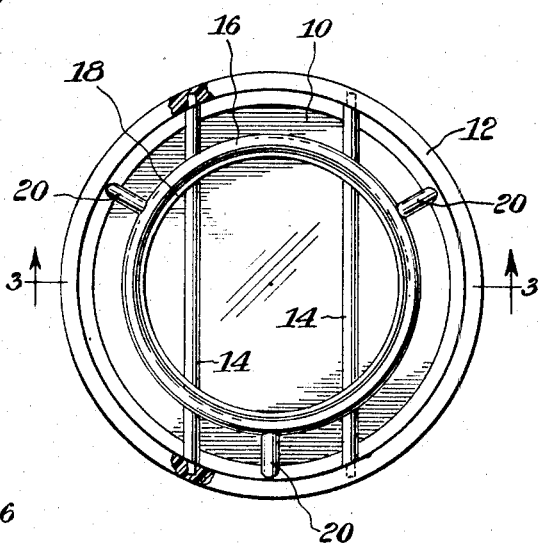
FIG. 2 is a top view thereof.
Figure 3:
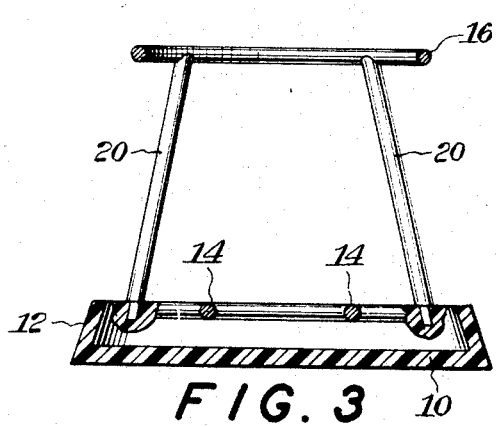
FIG. 3 is a cross section through 3—3 in FIG. 1.

Referring now to FIGS. 1–3, there is shown a flat horizontal circular solid weighted disc 10 having an upwardly and inwardly projecting peripheral lip 12 having a flat circular horizontal top surface. First and second horizontal parallel spaced apart equidistantly spaced bars 14 span the lip and are secured therein, the top surface of the bars being flush with the top surface of the lip. A horizontal ring 16 having its center vertically aligned with the center of the disc is positioned thereabove, the diameter of the ring being large enough to accommodate a drinking glass 18 and yet substantially smaller than the diameter of the disc. The height of the ring above the disc is so selected that it reaches more than half way to the top of the glass and less than the full height of the glass. Three equidistantly spaced upwardly and inwardly extending support bars 20 connect the ring to the top surface of the lip.

Figure 4:
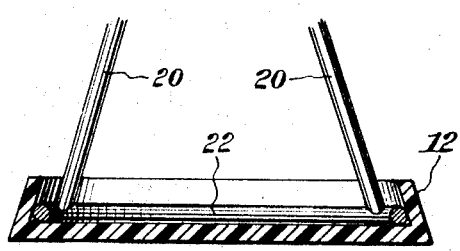
FIG. 4 is a cross sectional view of a modification thereof.

Alternatively, the bars 14 can be eliminated, as shown in FIG. 4, and a horizontal ring 22 only slightly smaller in diameter than the disc, with the center of the ring 22 aligned with the disc, can be placed inside the lip and in contact with the disc, the angle of inclination and diameter of the lip being such as to hold the ring rigidly in position. In this structure, the bars 20 are connected at their top ends to ring 16 as before, but the bottom ends are connected to ring 22 rather than the lip.

With either structure, once the glass is inserted therein, the disc and lip hold the bottom of the glass securely in place while ring 16 holds the top portion of the glass whereby the glass is held securely in place and cannot be accidentally dislodged or turned over.

While I have described my invention with particular reference to the drawings, my protection is to be limited only by the terms of the claims which follow.

Having thus described my invention, I claim as new and desire to secure by Letters Patent:

1. A non-tipping coaster for a drinking glass comprising:
    (a) a flat circular horizontal solid weighted disc;
    (b) a lip peripherally secured to said disc and extending upward and inward from the disc, said lip having a flat circular horizontal top surface;
    (c) a horizontal circular ring having its center vertically aligned with the center of the disc, the diameter of the ring being large enough to accommodate the glass and yet being substantially smaller than the diameter of the disc, said ring being disposed above the disc;
    (d) support means including three equidistantly disposed upwardly and inwardly inclined bars holding said ring rigidly in position above the disc and lip; and
    (e) first and second horizontal parallel spaced apart bars spanning the lip, the top surface of the bars being flush with the top surface of the lip.

2. A coaster as set forth in claim 1 wherein the top ends of said bars are secured to said ring and the bottom ends of said bars are secured to the top surface of said lip.

3. A coaster as set forth in claim 1 further including a second horizontal circular ring having a diameter only slightly smaller than said disc and with the center thereof being aligned with the center of the disc, said second ring being disposed in contact with the inner surface of the lip and the top surface of the disc, the top ends of the bars being secured to the ring disposed above the disc, the bottom ends of the bars being secured to said second ring.

References Cited

UNITED STATES PATENTS

| | | | |
|---|---|---|---|
| 723,964 | 3/1903 | Wilson | 312—280 |
| 2,538,612 | 1/1961 | Wuollet | 211—181 X |
| 2,784,577 | 3/1957 | Beaham | 248—346.1 X |

FOREIGN PATENTS

| | | |
|---|---|---|
| 605,316 | 9/1960 | Canada. |
| 44,829 | 4/1888 | Germany. |

CHANCELLOR E. HARRIS, *Primary Examiner.*